May 28, 1957 — H. KARAL — 2,793,622
OSCILLATING VALVE FOR DIAPHRAGM TYPE MOTORS
Filed Feb. 9, 1954 — 3 Sheets-Sheet 1

INVENTOR.
HANS KARAL
BY
ATTORNEY

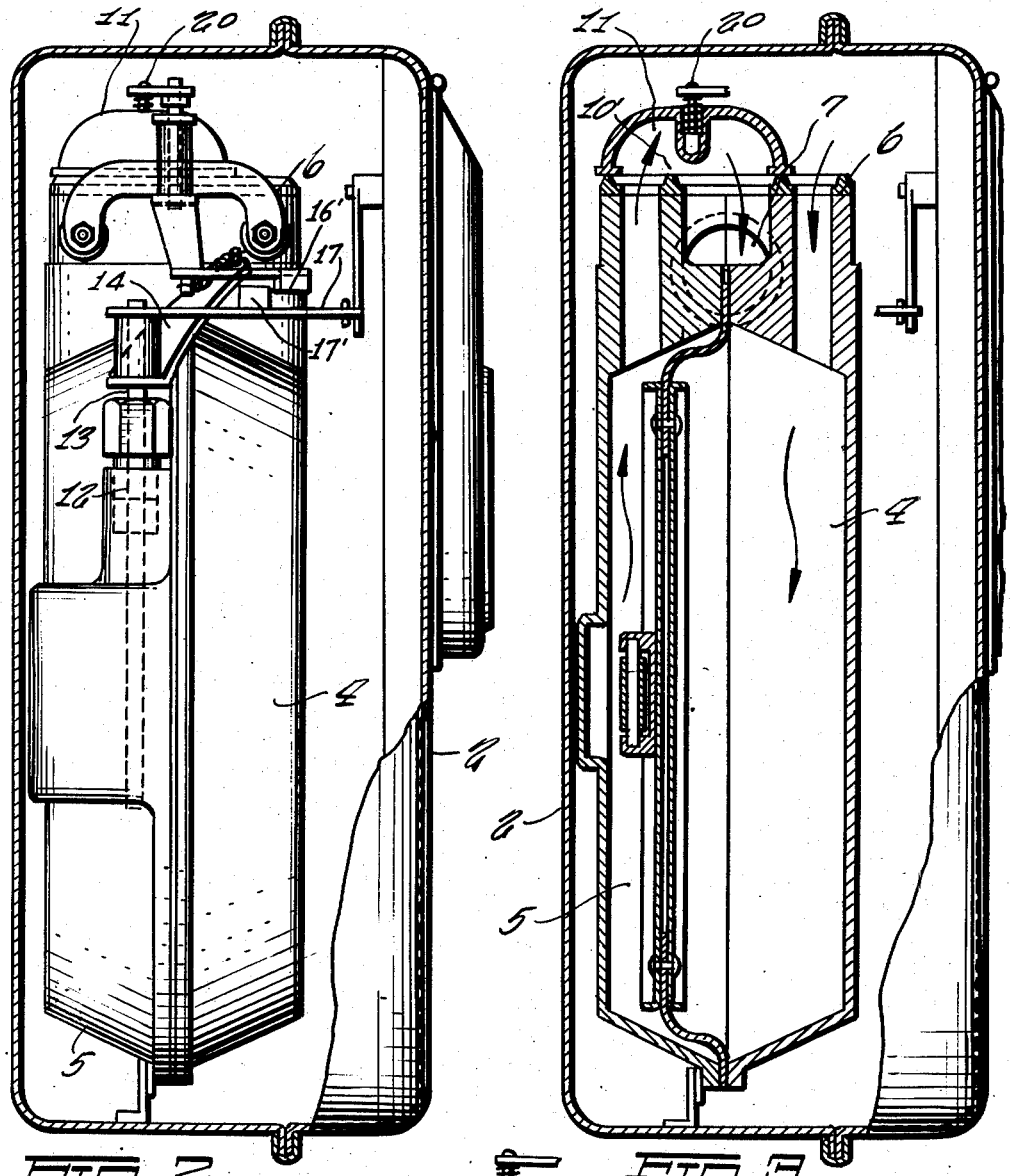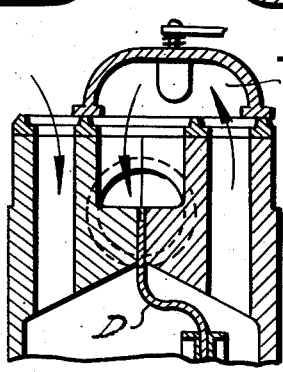

May 28, 1957 H. KARAL 2,793,622
OSCILLATING VALVE FOR DIAPHRAGM TYPE MOTORS
Filed Feb. 9, 1954 3 Sheets-Sheet 3
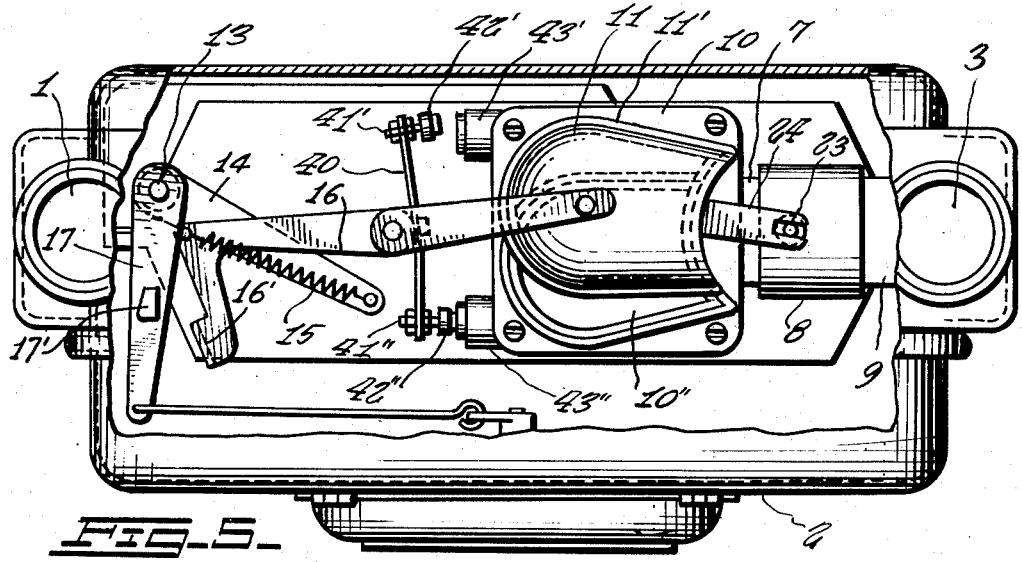
FIG. 5
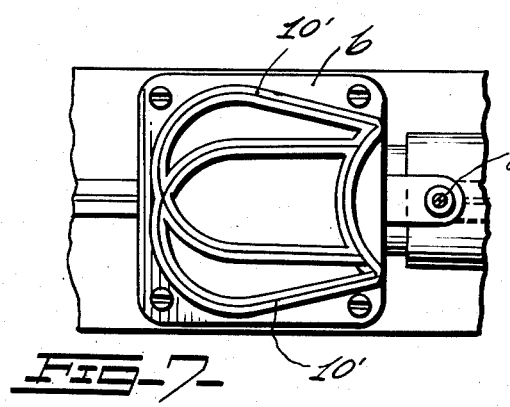
FIG. 7
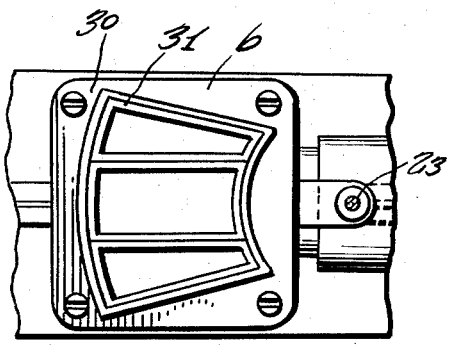
FIG. 9
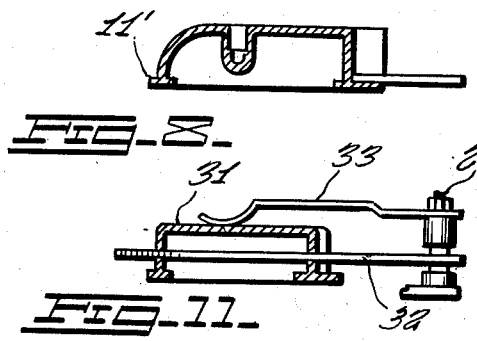
FIG. 8
FIG. 11
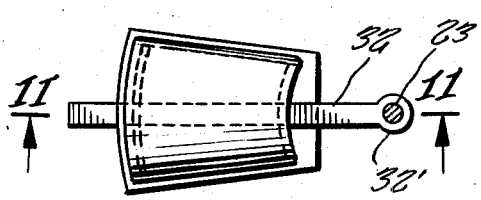
FIG. 10
FIG. 12
INVENTOR.
HANS KARAL
BY
ATTORNEY United States Patent Office 2,793,622
Patented May 28, 1957

2,793,622

OSCILLATING VALVE FOR DIAPHRAGM TYPE MOTORS

Hans Karal, Berlin-Neukoelln, Germany, assignor, by mesne assignments, to Aronco Meter Products Corporation, New York, N. Y., a corporation of New York Application February 9, 1954, Serial No. 409,175

Claims priority, application Germany February 13, 1953

9 Claims. (Cl. 121—48)

The invention relates to a two-chamber gas meter containing a sliding valve which directs the flow of gas in the said meter. This sliding valve, under the influence of a tripping mechanism the action of which is dependent on the movement of the diaphragm in the meter, moves over a tripartite valve seat, the latter being connected to the gas conduit. The movements of the sliding valve are controlled by the tripping mechanism, and the reversal of direction takes place in the extreme end positions of the diaphragm as a sudden quick action initiated by a spring.

According to this invention, the sliding valve in the gas meter turns on a pivot. This pivot is situated outside of the main body of the valve, at some distance from one of its transverse edges but on a longitudinal centerline of the valve. The tripping mechanism may either be connected at a point on the valve opposite the pivot, or may control the valve from a point on its main body opposite the pivot.

The special advantages of a two-chamber meter based on this invention are the simplified construction of the valve and its positive and simple motion on the valve seat. Further advantages are the highly favorable conditions under which the tripping mechanism transmits its own motion to the valve, the elimination of any mechanical resistance to smooth and quick operation of the valve, and the extremely simple construction of the entire assembly, permitting convenient access for inspection, cleaning and repair.

The drawing shows one version of a two-chamber gas meter based on the present invention, supplemented by a number of details of component parts. In the drawings:

Fig. 2 shows a side view of the meter in Fig. 1.

Fig. 3 shows a vertical section through Fig. 1, on lines 3—3.

Fig. 4 shows a detail, namely the valve shown in Fig. 3 in enlarged scale in an altered position.

Fig. 5 shows a top view of the meter shown in Fig. 1.

Fig. 7 shows a top view of the valve seat connected to the tripartite gas content of a two-chamber gas meter as shown in Figs. 1, 2 and 3 with projecting edges in the form of two horse shoes in an offset position to each other.

Fig. 8 shows a sectional view of the valve according to Fig. 7.

Fig. 9 shows a top view of an alternate form of a valve seat for the tripartite gas content of the meter according to Figs. 1–3, with projected edges to engage the valve, the edges being in the form of two ring sectors in an offset position to each other.

Fig. 10 shows a top view of a sliding valve for the valve seat in Fig. 9.

Fig. 11 shows a sectional view of the sliding valve in Fig. 10.

Fig. 12 is a detail.

Figure 1:
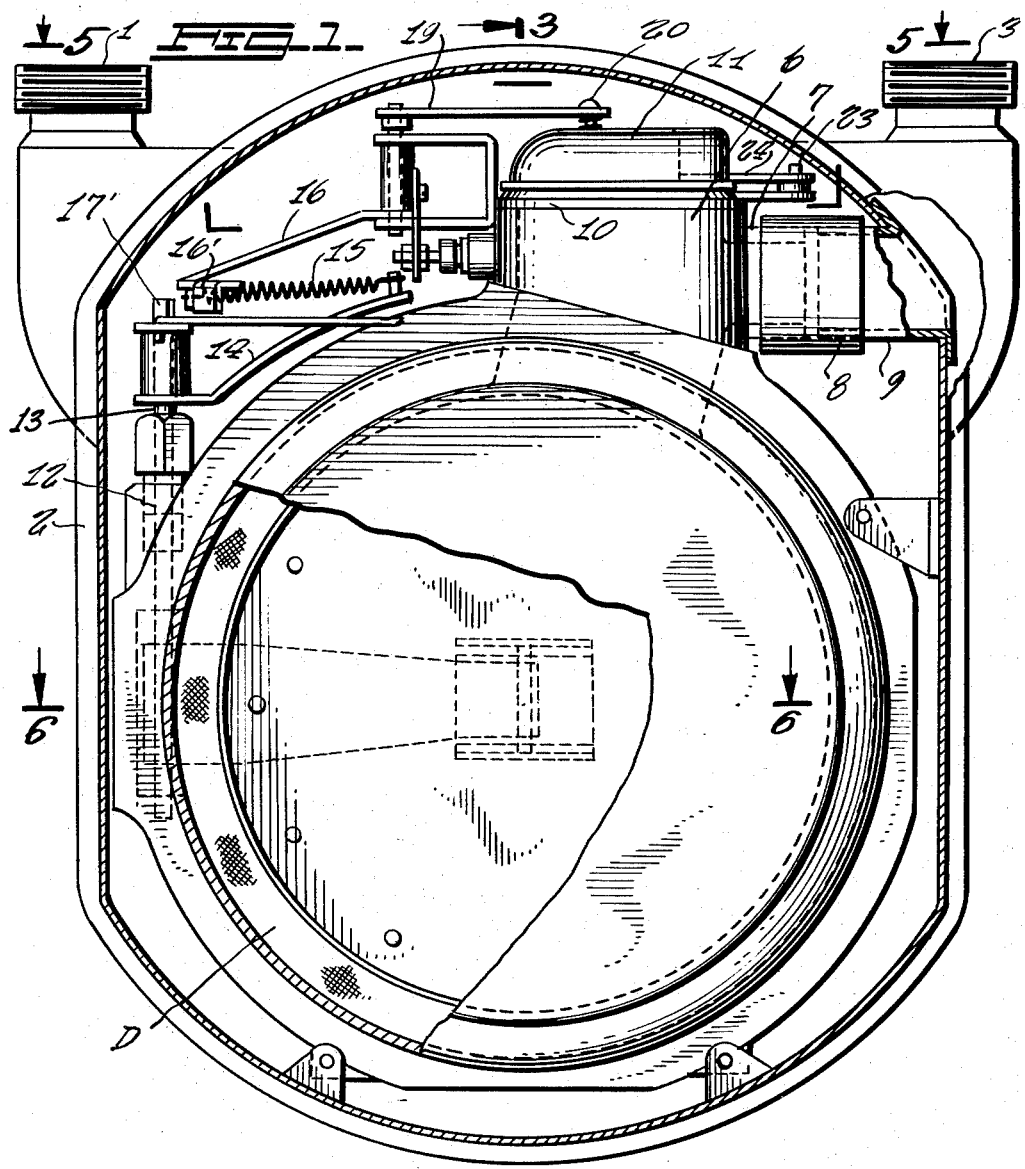
Fig. 1 shows a front view of a two-chamber gas meter according to the invention.
Figure 6:
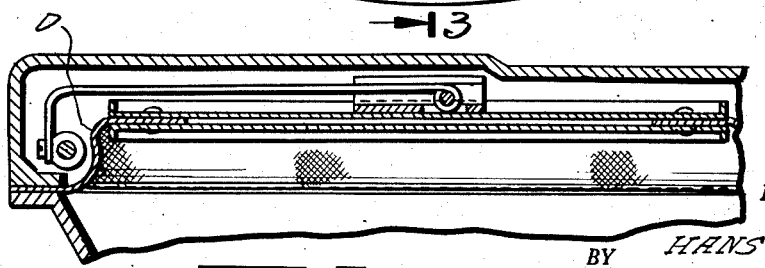
Fig. 6 is a horizontal section through Fig. 1 on line 6—6.

In a two-chamber gas meter as shown in Figs. 1–3, the gas to be metered enters through the inlet 1 of casing 2 and leaves the casing at 3, after metering. The gas, entering at inlet 1 into casing 2, flows under pressure into one of the measuring chambers in casing 2. This chamber is part of a measuring device comprising two shells 4 and 5 which are placed with their flanges against each other and preferably welded or clamped together, with a diaphragm D placed between the two flanges, and a tripartite gas conduit 6. The two lateral passages of the conduit are connected to the measuring chambers formed between the shells 4 and 5 and the diaphragm, whereas the central passage of conduit 6 opens into a nipple 7 which, via the flexible tube 8 and pipe 9 conducts the gas to outlet 3.

The tripartite conduit 6 is fitted with a valve seat 10. This valve seat is correspondingly divided into three parts by projecting edges 10' on its face, over which the valve 11 slides. The valve seat 10 with edges 10' may also be in one piece with the gas conduit 6.

The sliding valve 11 makes a gas-tight seal with the edges 10' of the valve seat 10, its motion being caused and controlled by the diaphragm, which moves under gas pressure and transmits its movement to the tripping mechanism which, in the end positions of the diaphragm on both sides, releases the spring 15, which in turn throws the valve over to the opposite side from its former position with a quick and sudden action. The movement of the diaphragm under gas pressure is transmitted by a single-arm lever, not shown in the drawing, to a shaft 13 vertically mounted in a stuffing-box 12 in which it rotates. A lever 14 is mounted on this shaft, which by its rotation gives tension to the spring 15. After the spring 15 is expanded during the travel of the diaphragm from one end position to the other, the spring is released only when the end position of the diaphragm is reached, because a stop 16' retains the lever 16, by pressing against pawl 17' fixed on the lever 17 rigidly attached to shaft 13 and rotating with it, until the pawl 17' has passed 16'. At this instant the lever 16 snaps over to the opposite side, the energy stored in spring 15 now being released. This movement of 16 is transmitted to the lever 19, lever 16 and lever 19 being rigidly connected to shaft 18. Lever 19 transmits its rotation by means of pin 20 to the sliding valve 11. This pin 20 enters a vertical recess in valve 11, and with the movement of 20 the valve is thrown over, turning on a pivot 23 by means of an arm 24. The arm 24 is fixed on a longitudinal centerline of valve 11, and protrudes beyond the edge of the valve in the direction opposite to the side on which spring 15 acts. The arm 24 is slotted at its free end, the slot engaging pivot 23, also situated on the longitudinal centerline of valve 11 and valve seat 10, and rigidly fixed to a prolongation of 10. Corresponding to the movements of the diaphragm, pin 20 moves 11 from one side of the valve seat to the other in such a manner that each of the lateral ports of the tripartite conduit 6 is alternately exposed by valve 11, which the central port is constantly covered by 11. During these movements, as well as while the valve 11 is stationary, the latter is pressed against the projecting edges 10' of valve seat 10 by a compression spring 22, providing a tight seal between 10' and 11.

After each actuation of the valve, the gas flows under its normal pressure into the casing 2 and then passes through the part of the tripartite conduit 6 exposed by the switching action of the valve into the measuring chamber previously emptied, moving the diaphragm to the opposite end position. By the movement of the diaphragm, the next actuation of the tripping mechanism is prepared, and at the same time the gas volumme which has flowed into the gas chamber is released through the corresponding lateral passage of conduit 6, the cavity of the sliding valve 11, the central passage of 6, the nipple 7, and finally through the flexible tube 8 and pipe 9 to the outlet 3 of the meter.

The corresponding movement of the lever 17 rigidly mounted on shaft 13 is then transmitted by means of a lever 25 mounted on its free end to the indicator, omitted in this drawing for greater clarity.

The valve seat 10 shown in Fig. 7 as a part of the two-chamber gas meter shown in Figs. 1–3, corresponds to a special and particularly advantageous subdivision of conduit 6. In this special subdivision, which constitutes a substantial feature of the invention, the projecting edges 10' of the valve seat 10 form two horseshoes, which are offset from each other and situated on an annular area concentric with the pivot 23 of valve 11. The particular advantage of this subdivision of conduit 6 is the extremely low resistance which the edges 10' on valve seat 10 offer to the motion of valve 11. The representation of valve 11 in Fig. 5 shows the corresponding horseshoe shape of valve 11, combined with the sliding plate 11', trapesoidal in outline. Attached to 11' is on arm 24 pivoted by its slotted free end on pivot 23, which is attached to a prolongation of the valve seat 10.

Fig. 9 shows another form of valve seat 30, corresponding to another manner of subdivision of conduit 6. The projecting edges 30' of this valve seat form two ring sections which are offset from each other on the same annular area. Figs. 10 and 11 show a valve 31 corresponding to valve seat 30, where the special design of 31 permits a far-reaching simplification of the tripping mechanism. In the end walls of the hollow body of 31, and in the direction and position of its longitudinal centerline, a preferably round rod 32 projects through gas-tight mountings at both ends. The end of the rod 32 toward pivot 23 is shaped into an eye 32' movably attached to pivot 23, while the other end of 32 engages a slot to be provided in a vertically bent extension of lever 19 (Fig. 12). In such a valve, the provision of a special pin at the free end of lever 19 becomes superfluous. A leaf spring 33 fixed on pivot 23 holds down the valve 31 under sufficient pressure on the edges 30' of valve seat 30 when set in motion by the action of the tripping mechanism.

The application of a recess in valve 11 is not confined to valve as shown in Figs. 1 and 8, nor is the application of a rod situated on the longitudinal centerline of the valve confined to a valve as shown in Figs. 10 and 11. A valve as in Figs. 1 and 8 may be provided with a longitudinal rod, and a recess for the reception of a pin can be used for an arrangement as in Figs. 10 and 11.

The two offset horseshoe-shaped projecting edges 10' on the valve seat 10 shown in Fig. 7 are congruent to each other, as are the two offset ring sectors formed by the projecting edges 30' on the valve seat 30 (Fig. 9).

A special advantage of two-chamber gas meters according to this invention is the possibility of placing the vertical centerline of the tripartite conduit 6 on one side of the vertical centerline of the supporting shells 4 and 5. This possibility of a sidewise arrangement of the valve system to the shells can be exploited in a considerable diminution of the height of the casing.

An especially advantageous feature can be added to the tripping mechanism by applying elastic stops for limiting the actuating movements. These stops according to the invention, can be combined with buffers. On the tripping mechanism as shown in Fig. 5, a double-arm leaf spring 40 is provided, which is fixed by its center at a suitable point of the tripping mechanism. On the free ends of this leaf spring, nuts 41' and 41'' are provided for adjustment of the stops 42' and 42'' against buffers 42' and 43'' placed outside the wall of conduit 6.

What I claim is:

1. A two-chamber gas meter, comprising a tripping mechanism and a diaphragm controlling said mechanism, said mechanism being provided with a valve formed with curved edges and a valve seat in a tripartite gas conduit, said valve turning on a pivot situated outside the valve body at a distance from its own wall and on its longitudinal center line, wherein said valve seat is provided with two offset curved parts and edges projecting congruently to the curved edges of said valve.

2. The two-chamber gas meter set forth in claim 1 in which said offset parts of the valve seat are horseshoe-shaped.

3. The two-chamber gas meter set forth in claim 1 in which said offset curved parts of the valve seat have the shape of ring sectors.

4. The two-chamber gas meter set forth in claim 1 in which the tripping mechanism operates on the side of said valve opposite to its pivot.

5. The two-chamber gas meter set forth in claim 4 in which the valve fits with a rod situated on its longitudinal center line and projecting on both ends, one end being provided with an eye mounted on a pivot and situated on the same center line and the other projecting end of this rod being connected to the operating lever of the tripping mechanism.

6. The two-chamber gas meter according to claim 5 in which the connection of the operating lever of the tripping mechanism with the rod of the valve is actuated by means of a slot at the free end of the operating lever.

7. The two-chamber gas meter set forth in claim 6 in which the free end of the operating lever of the tripping mechanism is connected to the valve, acting upon it at a point on the longitudinal center line of the valve body.

8. The two-chamber gas meter set forth in claim 1 in which the valve is provided with a recess for accommodation and attachment of a pin of the tripping mechanism.

9. The two-chamber gas meter set forth in claim 1 in which the valve moves on said valve seat of the tripartite gas conduit under the action of a compression spring which presses said valve in any position against said valve seat in the very center of the same.

References Cited in the file of this patent

UNITED STATES PATENTS

| | | |
|---|---|---|
| 196,958 | Weir | Nov. 6, 1877 |
| 1,747,921 | Abels | Feb. 18, 1930 |
| 1,841,634 | Rolstad | Jan. 19, 1932 |
| 1,912,777 | Duskin et al. | June 6, 1933 |
| 2,069,016 | Newton | Jan. 26, 1937 |
| 2,544,665 | Gilmore | Mar. 13, 1951 |
| 2,664,074 | O'Shei | Dec. 29, 1953 |